United States Patent Office.

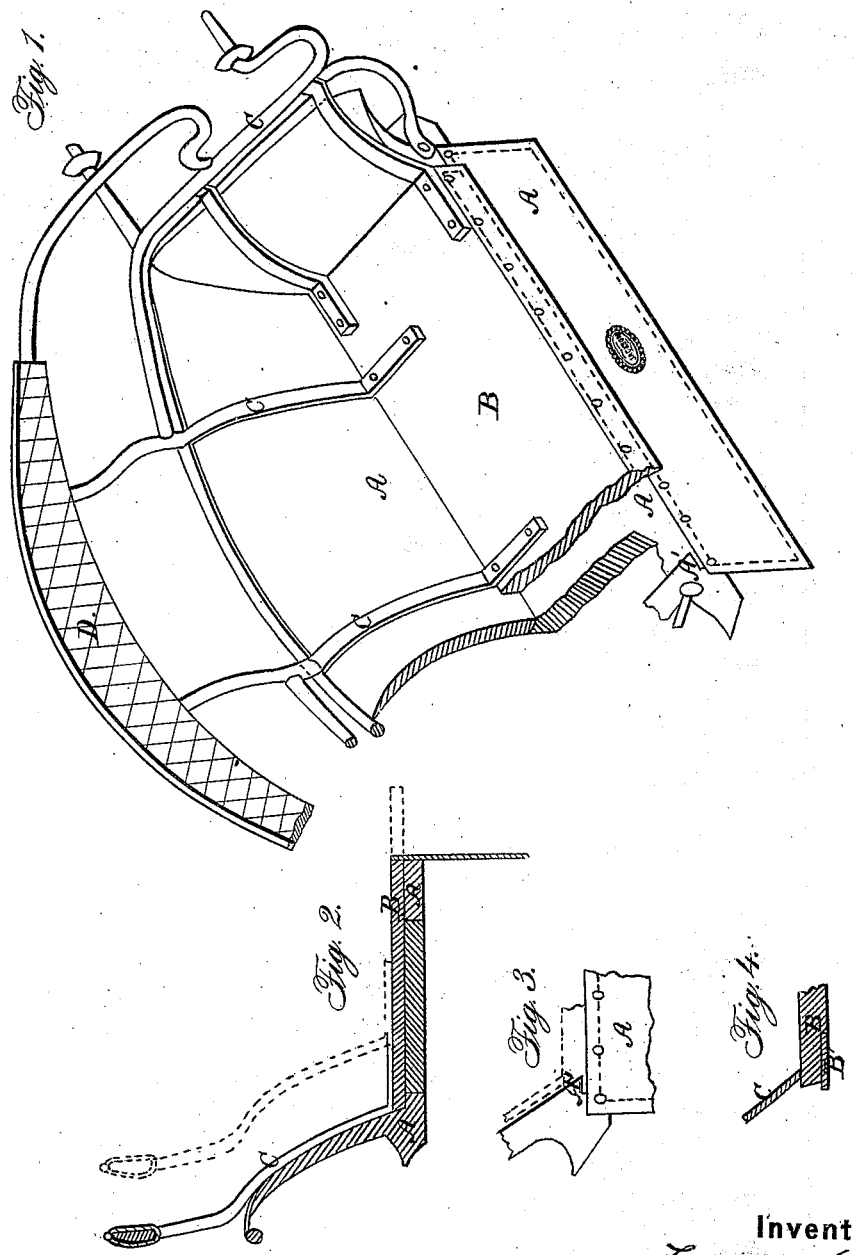

FREEGIFT JACKSON, OF SPARTA, OHIO.

Letters Patent No. 60,737, dated January 1, 1867.

IMPROVEMENT IN COMBINED SEAT AND TOP FOR CARRIAGES.

*The Schedule referred to in these Letters Patent and making part of the same.*

TO ALL WHOM IT MAY CONCERN:

Be it known that I, FREEGIFT JACKSON, of Sparta, in the county of Morrow, and State of Ohio, have invented a new and useful Improvement in Carriages; and I do hereby declare that the following is a full, clear, and exact description of the same, reference being had to the annexed drawings, making part of this specification, in which—

Figure 1 is a perspective view.

Figure 2 is a transverse section.

Figure 3 is a cross-section of the seat.

Figure 4 is a cross-section of the slide.

The same letters are employed in referring to identical parts in the various figures.

The object of this invention is to provide a convenient means of adding to or removing from the seats of vehicles the ordinary covered top, so as to make it an open or covered carriage seat, as may be desired. This I accomplish by the means following, viz:

A is the seat of the carriage, which is completed and finished in any style, according to taste, the ends being made parallel. A groove, A', runs the width of the seat in the end pieces immediately above, its lower part being on a line with the bottom. B is a supplementary seat, fitted to just the size of the seat A, having an iron framework, C, securely fastened to it and supporting the ordinary calash top in the manner familiar in buggies. On the edge of the supplementary bottom is fastened a projecting cleat, B, which fits into the groove A'. By these means or other equivalent arrangements of parts the supplementary seat B may be slid into place so as to form a covered seat, or removed, leaving an open seat. The supplementary seat being complete in itself, including all the parts of a seat and cover, no bolts are required to be removed, nor is any part liable to be bent or broken by being detached. The seat A being complete in itself there are no recesses or remaining studs or bolts to indicate that the buggy is convertible, except the narrow recesses A', which can only be seen on a minute inspection. The framework C and elevated back D, being withdrawn with the supplementary seat, entirely changes the appearance of the seat, so that the different constructions will to casual observation represent two different vehicles, one covered, the other uncovered.

What I claim as my invention, and desire to secure by Letters Patent, is—

1. Attaching a carriage top to a supplementary seat, B, which may be placed above a permanent seat, A, or removed, so as to form a covered or uncovered seat, substantially as described.

2. Connecting the frame supporting a carriage top, with the permanent seat A, by means of slides and grooves, so as to permit the frame and top to be removed or attached by a single movement, substantially in the manner set forth.

In testimony whereof I have signed my name to this specification in the presence of two subscribing witnesses.

FREEGIFT JACKSON.

Witnesses:
 D. P. HOLLOWAY,
 C. F. CLAUSSEN.